United States Patent [19]

Muller

[11] Patent Number: 5,030,421

[45] Date of Patent: Jul. 9, 1991

[54] INTEGRAL CENTRIFUGE TUBE AND SPECIMEN SLIDE

[75] Inventor: Louis F. Muller, Los Angeles, Calif.

[73] Assignee: Davstar Industries, Inc., Newport Beach, Calif.

[21] Appl. No.: 238,896

[22] Filed: Aug. 31, 1988

[51] Int. Cl.⁵ .............................................. B01L 3/00
[52] U.S. Cl. .................................... 422/102; 422/58; 422/61; 422/64; 422/72; 436/45; 436/46; 436/165; 436/177; 436/180; 436/808; 436/810; 435/296; 435/310; 494/16; 356/244; 356/246; 356/427; 356/440; 350/442; 350/319
[58] Field of Search ................... 422/58, 61, 64, 72, 422/102; 436/45, 46, 165, 177, 180, 808, 810; 435/296, 310; 494/16; 356/246, 244, 440, 427; 350/442, 319

[56] References Cited

U.S. PATENT DOCUMENTS

| | | | |
|---|---|---|---|
| 3,718,133 | 2/1973 | Perry et al. | 422/102 |
| 3,814,522 | 6/1974 | Clark et al. | 422/102 |
| 4,066,414 | 1/1978 | Selby | 422/102 |
| 4,105,415 | 8/1978 | Lovett | 422/58 |
| 4,427,634 | 1/1984 | Truglio | 422/99 |
| 4,528,187 | 7/1985 | Truglio | 422/102 |
| 4,560,269 | 12/1985 | Baldszun et al. | 356/246 |
| 4,624,835 | 11/1986 | Davis et al. | 422/102 |
| 4,786,594 | 11/1988 | Khanna et al. | 422/102 X |
| 4,865,812 | 9/1989 | Kuntz et al. | 422/101 X |

Primary Examiner—Robert J. Warden
Assistant Examiner—Lynn M. Kummert
Attorney, Agent, or Firm—Henry M. Bissell

[57] ABSTRACT

A generally tubular container integrally formed and communicating with a microscope slide member having an enclosed specimen chamber. The container is adapted to serve as a centrifugation tube and a permanent handle for manipulation of the microscope slide member. The back of the device is generally flat and the front and sides of the collection tube are generally rounded except for a concave region extending longitudinally from the upper face of the microscope slide member to provide clearance for rotating a lens turret for high power viewing of a specimen in the slide chamber.

22 Claims, 2 Drawing Sheets

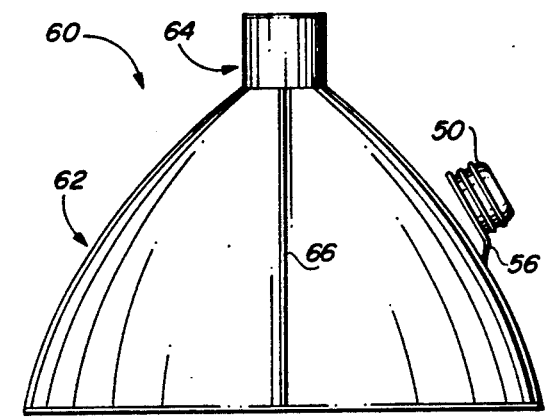
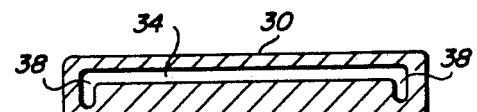
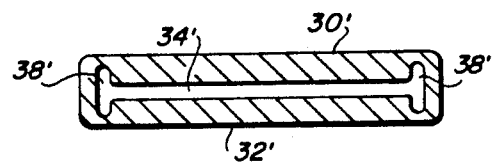
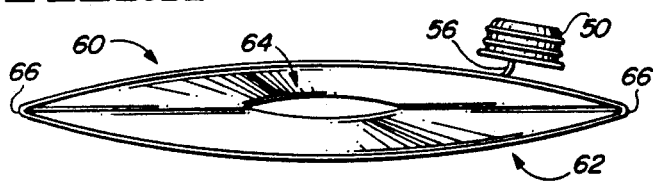
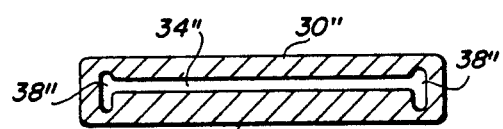
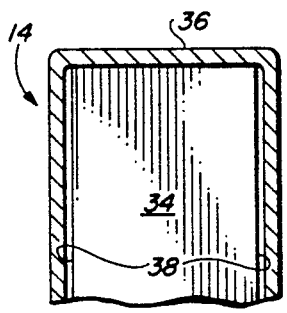
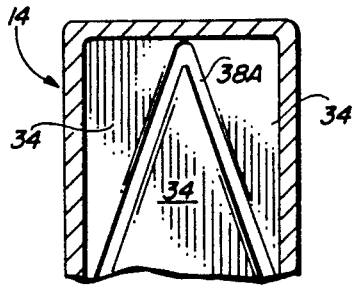
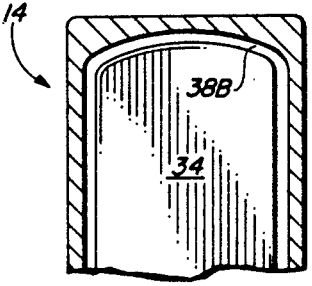
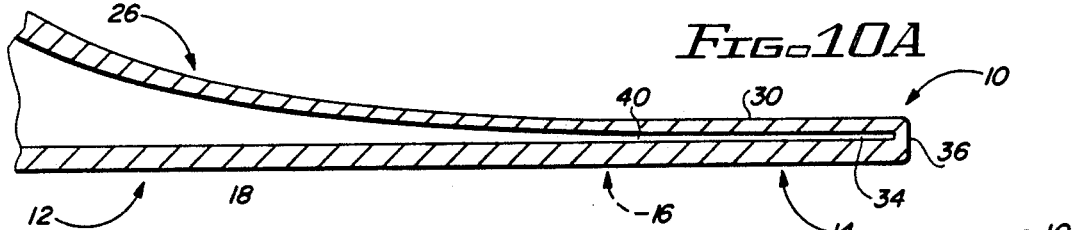
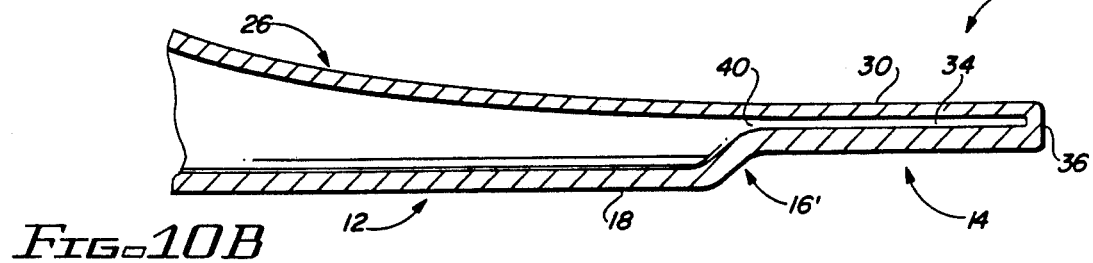

INTEGRAL CENTRIFUGE TUBE AND SPECIMEN SLIDE

BACKGROUND OF THE INVENTION

1. Field of the Invention

The present invention generally relates to laboratory equipment and, more particularly, to an integral biological specimen collection tube and microscope slide constructed as a unitary device.

2. Description of the Related Art

Various types of laboratory devices have been devised in the past for the collection and handling of biological specimens. Certain of such devices are used particularly in laboratory centrifuges and the like. Complete urinalysis typically involves centrifugation of the specimen to isolate any sediment for microscopic study. Most procedures and devices currently in use require pouring the test liquid into a centrifuge tube and separately decanting the supernatant liquid from the sediment after centrifugation, then transferring the sediment to a microscope slide. Such procedures are time-consuming and expensive. Moreover, these individual steps are multiple in character, take the time of the technician, and increase the technician's contact with the specimen.

An improved combination collector tube and microscope slide member is described in U.S. Pat. No. 4,066,414. The tube and slide member are connected by a narrow, weak, frangible neck which is intended to be snapped through to remove the collection tube when the slide member is to be used. However, manufacturing and handling difficulties may occur with such a device. Moreover, the small delicate slide member must be separately handled after detachment, usually by mounting it in a secondary carrier, in order to place it into viewing position.

There remains a need for an improved type of device which can be used for initial biological liquid collection, subsequent centrifugation, sediment isolation and microscopic examination, all without transferring the test materials to other laboratory equipment. While the specimen tube of U.S. Pat. No. 3,814,522 would appear to present these features, it has been found that there are still serious drawbacks in that device. For example, the thin flat terminal chamber of the device, which is intended for microscope viewing, is aligned substantially with the central axis of the enlarged upper body portion (the centrifuge tube proper). This locates the slide portion substantially above the microscope stage, when in use, and undesirably affects the microscope optics. Moreover, it is impossible to view the slide portion at different powers of microscope magnification without shifting the device out of the way while the microscope lens turret is rotated and then repositioning the device for viewing at the newly set level of magnification. This procedure is unduly time consuming and requires an added level of skill in the viewer to achieve proper results.

SUMMARY OF THE INVENTION

In brief, arrangements in accordance with the present invention comprise an upper, hollow, generally tubular container which serves as a specimen collection member, having a central specimen collection space therein communicating with the open upper end of the container. The device also includes a lower integral microscope slide member having transparent flat front and rear walls throughout at least part thereof and defining a central specimen cavity communicating with the container space through the lower end of the container. The juncture between the generally tubular container portion and the slide member portion is a transition section in which the cross-section of the tubular portion reduces to match the cross-section of the slide portion. There is no frangible break line or narrow orifice between the two portions as in the device of U.S. Pat. No. 4,066,414.

The container also serves as a permanent rigid handle for the microscope slide member. The tubular container portion of the device has a flattened side presenting a planar surface extending completely along the tubular container portion from the transition section to the open end of the container. The narrow lip projecting outward and extending about the open end of the tubular container portion is removed at the juncture with the planar surface. For convenience in orientation, the planar surface will be regarded as extending along the rearward side of the tubular container portion.

The slide portion of the device provides a viewing section extending approximately ⅜ inch beyond the transition section and centrally located between gradually narrowing tapered edges which are continuations of the tapered side surfaces of the tubular container portion. The upper and lower faces of the microscope slide portion are generally parallel and spaced apart by approximately 0.008 to 0.010 inches, over the major part of the slide cavity. The upper face, which serves as a cover slip, is from 0.009 to 0.012 inch thick. The lower face of the slide portion is approximately 0.040 inch thick and, in one embodiment, is spaced just slightly from the plane of the flattened face of the tube portion, approximately 1/16 inch, thus protecting the slide portion from possible scratching by any surface on which the device is placed with the flat side down. The slide portion of this device is displaced only slightly from the stage of a viewing microscope when the device is in position for viewing, thereby achieving optimum optical clarity for viewing. The enclosed space of the slide portion is sufficient to receive a normal sediment sample from a specimen placed in the tubular container portion while maintaining the sediment sufficiently dispersed as to permit viewing thereof through a microscope. Preferably, a monocellular layer of sediment is desired. However, sediment crystals in urine or blood platelets have a tendency to pack at the entrance of the slide portion if the aperture is too small. Thus, the aperture is slightly larger than the minimum size necessary to accommodate such sediment. Furthermore, the capability of the slide portion to receive the specimen sediment constituents is enhanced by the provision of two channels on opposite sides of the slide portion extending downwardly from the plane of the aperture. The width of these channels is approximately equal to the spacing in the slide cavity. These channels extend along opposite sides of the slide cavity to approximately the end of the cavity. These channels advantageously reduce the tendency of packing of crystals at the entrance portion of the slide cavity to block sediment from reaching the viewing section, since any sediment passing into the channels becomes distributed within the slide cavity.

Although in one preferred embodiment, the channels depend downwardly from the slide cavity, other channel configurations are possible and suitable for the purpose. While the embodiment which has just been described may be characterized as an inverted U-shaped cross section, other configurations may be in the form of an I-shaped cross section or a H-shaped cross section, to name a few. The side channels may extend straight along the side edges of the slide cavity, terminating at the end of the cavity, as will be the case for injection molded plastic forms of the invention. Alternatively, it may be possible to have the side channels extend completely around the distal end of the slide cavity, joining together at the central axis of the cavity for thermoformed or blow-molded embodiments of the invention.

Preferably, the integral centrifuge tube and specimen slide of the present invention is provided with a cap closure which may be used to close the open end of the device when the liquid specimen is placed therein. This is not an essential constituent of the combination, but where included it eliminates the otherwise necessary step of decanting the supernatant liquid from the specimen container after centrifuging before the sediment collected in the slide cavity may be viewed in normal fashion through a microscope. The cap is generally of the same cross sectional shape as the tubular container portion and matches the dimensions of the opening. It is formed with a pair of peripheral sealing ridges which protrude slightly from the cap body to provide an improved seal against the inner surface of the tubular container opening.

Another desirable adjunct to the device of the present invention, although not essential to its normal use, is a funnel which is used by the patient in directing the specimen into the tubular container. Such a funnel is preferably thermoformed of a suitable closed cell foam material, approximately 1/16 inch thick, and sufficiently flexible to be packed flat. The cap may also be formed of the same material and integrally with the funnel. Thus the entire combination can be placed in a plastic envelope and distributed for marketing at minimum cost. With this arrangement, after removal from the plastic or paper envelope in preparation for use, the funnel is squeezed at the flattened side edges to restore its generally round shape and the short neck of the funnel is inserted into the opening of the tubular container. The cap is initially attached to the outside of the funnel. The liquid specimen is deposited within the funnel which directs it into the tubular container. Thereafter the cap is removed from the funnel, the funnel is removed from the tubular container and the cap is inserted to seal the opening thereof. For the collection of urine specimens, the combination in accordance with the present invention provides a urine transport system which automatically prepares a microscope slide by centrifuging a specimen.

On the front side of the tubular container portion, opposite the rearward planar surface, is a gradually receding section which curves smoothly and continuously from a juncture with the upper face of the slide portion to a point approximately 2 inches from the center of the slide portion where it smoothly transitions into the slightly tapered cylindrical shape of the tubular container portion. This results in a generally flattened section of varying thickness of the tubular container portion which provides clearance to permit changing of the magnification level of a microscope when the microscope slide portion is in a position for viewing without the necessity of temporarily removing the device while the magnification level is adjusted. Thus, the lens turret of a multi-lens microscope may be rotated while the device of the present invention is in place for viewing of the slide portion without encountering any interference or obstruction from the integral tubular container portion. The device of the present invention may be readily molded in modern plastic molding equipment, is esthetically pleasing in appearance, is effective in use in centrally positioning and displaying the sediment from a centrifuged specimen for microscope viewing, and is low in cost and reliable in use so as to be readily disposable after a single use.

BRIEF DESCRIPTION OF THE DRAWING

A better understanding of the present invention may be realized from a consideration of the following detailed description, taken in conjunction with the accompanying drawing in which:

FIGS. 7A and 7B are, respectively, side and end views of a collapsible funnel and cap for use with the device of FIG. 1;

FIGS. 8A-8C are cross-sectional views showing alternative shapes for the slide portion of the device of FIG. 1, including side channels;

FIGS. 9A-9C are partial plan views of a slide portion of the device of FIG. 1 showing alternative outline shapes of the channels associated therewith; and FIGS. 10A and 10B are partial side sectional views of alternative embodiments of the device of the present invention.

DESCRIPTION OF THE PREFERRED EMBODIMENTS

Figure 1:
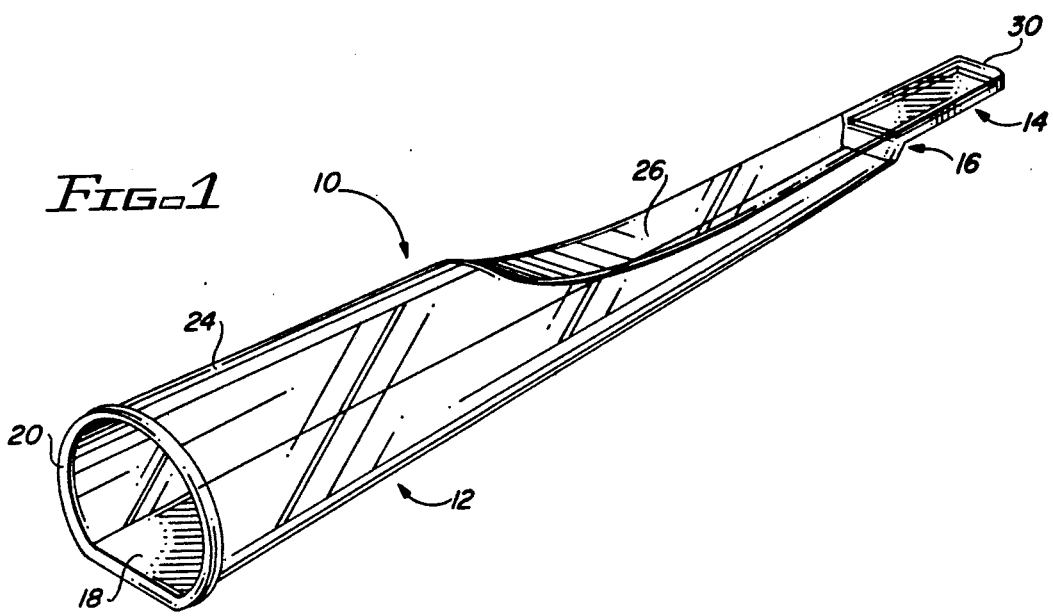
FIG. 1 is a perspective view of the preferred embodiment in accordance with the present invention.
Figure 2:
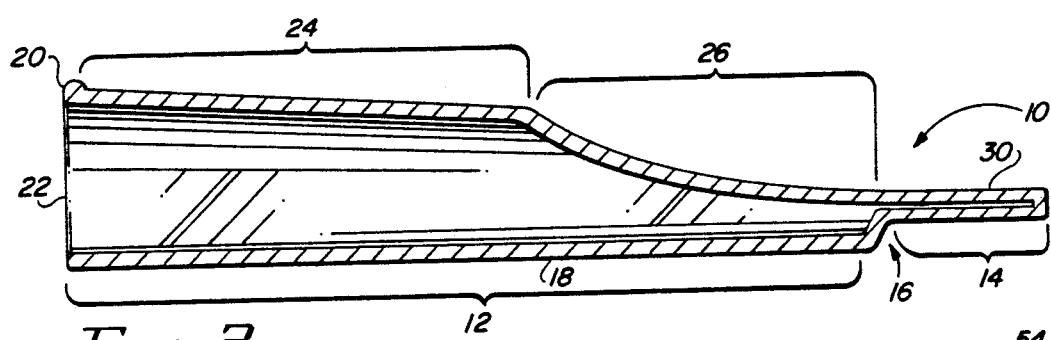
FIG. 2 is a side sectional view of the device of FIG. 1.
Figure 4:
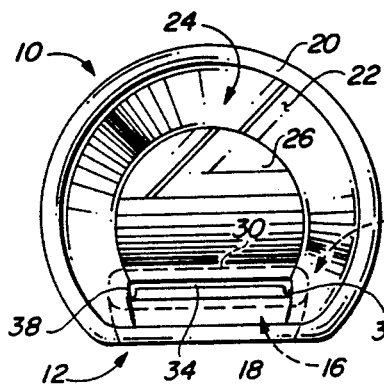
FIG. 4 is a view of the device of FIG. 1, taken from the left-hand or open top end.
Figure 5:
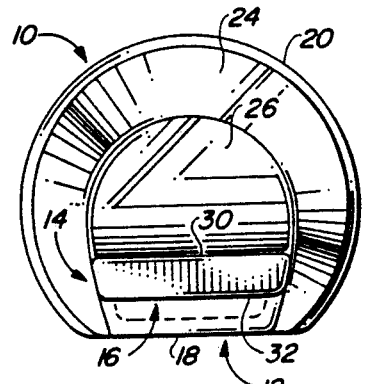
FIG. 5 is a view of the device of FIG. 1, taken from the right-hand or closed bottom end.

A first preferred embodiment of the improved unitary specimen collection tube and microscope slide device of the present invention is schematically depicted in FIGS. 1 and 2. FIGS. 4 and 5 are, respectively, left end and right end elevational views of the device of FIGS. 1 and 2. It will be understood that the device could also be used for other purposes, such as in the chemical analysis of inorganic materials and the like, but has its greatest applicability to laboratory analysis of specimens such as urine, blood and like biological fluids. Device 10 comprises a tubular container portion 12 and a specimen slide portion 14 on opposite sides of a transition section 16.

Device 10 is transparent and comprises a flat rear wall 18 running the length of the container portion 12. The container portion has a lip 20 which projects circumferentially about the open end 22, except along the edge of the rear wall 18.

The tubular container portion 12 is further divided into a slightly tapered, generally cylindrical (except for the flat rear wall 18) section 24 and a gradually receding clearance section 26 which curves radially inwardly from a juncture with the generally cylindrical section 24 to merge with the upper face 30 of the slide portion 14. The section 26 constitutes a "high power curve" which permits shifting the turret of a multi-lens microscope for different levels of viewing power and, in the embodiment shown in FIG. 1, is a generally transversely flat, longitudinally curved, concave surface which is a continuation of the upper face 30 of the slide portion 14.

Figure 3:
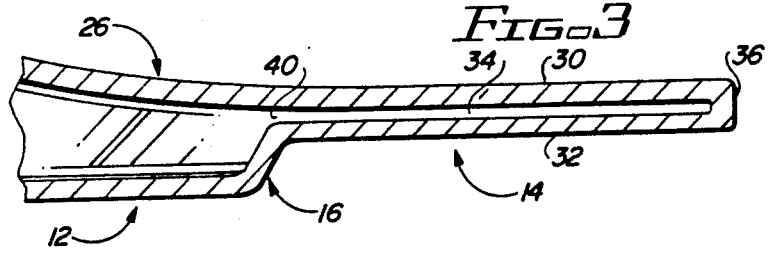
FIG. 3 is an enlarged sectional view of a portion of FIG. 2.

As indicated in the enlarged cross-sectional view of the slide portion 14 in FIG. 3, the upper face 30 and lower face 32 are essentially parallel and define between them a thin chamber 34 which is closed at the distal end 36. The slide portion 14 is much like a standard microscope slide bearing a mounted specimen, the lower face 32 being approximately 0.040 inch in thickness and corresponding to the slide proper. The upper face 30 is approximately 0.009 to 0.012 inches thick and corresponds to a slide cover slip. The chamber 34 is approximately 0.008 to 0.010 inch thick and contains the mounted specimen. The high power curve section 26 is essentially tangent to the flat upper face 30 where they join and merges into it at approximately the transition section 16.

FIG. 4 is an end view of the device 10 as it appears viewed from the left-hand end, as shown in FIGS. 1 and 2, through the opening 22. FIG. 5 is an end view of the device 10 taken from the opposite, closed end. The view of FIG. 4 shows a pair of side channels 38 which extend generally along opposite sides of the chamber 34. These side channels 38 preferably extend to the end 36 of the chamber 34. Although the device 10 could be constructed without the channels 38, they perform an important function in the automatic preparation of the specimen slide by alleviating the tendency of the specimen particles, such as crystals in a urine specimen, to pack up and develop a blockage at the entrance to the chamber 34. The channels 38 serve to provide additional passageways for the sedimentary particles which are then enabled to migrate in to the central portion of the chamber 34 from the sides as well as through the transverse opening 40 in the vicinity of the transition section 16. With such an arrangement, the resulting specimen in the microscope slide chamber is very close to the desired monocellular array in thickness.

These side channel 38, taken with the chamber 34, may form different configurations, of which a few are shown in FIGS. 8A–8C. The chamber opening in the cross-sectional view of FIG. 8A may be described as an inverted U-shape and corresponds to the configuration depicted in FIG. 4. FIG. 8B shows a cross-sectional configuration which is generally I-shaped and has side channels 38' with open portions extending both above and below the chamber 34' by essentially equal amounts. FIG. 8C depicts an H-shaped cross-section in which the side channels 38" extend downwardly from the chamber 34" by approximately the same amount as shown in FIG. 8A but extend upwardly from the chamber 34" less than in FIG. 8B.

FIGS. 9A–9B are schematic plan views of alternative slide portions 14 having channels 38, 38A, and 38B, respectively, of different shapes as viewed from above. In FIG. 9A, the side channels 38 extend straight along to the end 36 on opposite sides of the chamber 34. This is the configuration generally preferred for devices of the invention which are prepared by injection molding. FIG. 9B shows a generally v-shaped channel 38A which extends across the chamber 34. FIG. 9C shows a generally U-shaped channel 38B which extends along the sides and across the bottom of the chamber 34. The configurations of FIG. 9B and 9C may be feasible for devices of the present invention which are formed by other than injection molding; e.g., thermoforming.

Figure 6A:
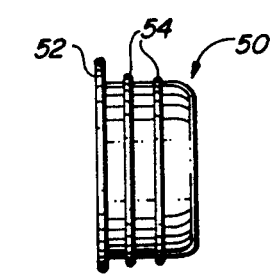
FIGS. 6A and 6B are, respectively, side and end views of a cap for the device of FIG. 1.
Figure 6B:
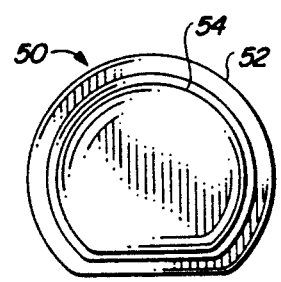

FIGS. 6A and 6B depict an optional cap closure for the open end 22 of the device 10. The cap 50 may be thermoformed of an inexpensive plastic material to have a peripheral lip 52, generally matching the lip 20 of the device 10, and a pair of circumferential, outwardly protruding, sealing rings 54. In the use of the device 10, cap 50 is placed in position to close the open end 22 of the device 10. Since this sealingly closes the opening 22, the device 10 may be laid down on its flat surface 18 or may be handled in any attitude without concern that the liquid portion of the specimen will run out. The cap 50 is designed to be discarded with the device 10 when the microscope analysis of the specimen in the chamber 34 has been completed.

If desired, the cap 50 may be integrally formed as part of a flexible plastic funnel 60 which is shown in FIGS. 7A and 7B. Funnel 60 is shown comprising a receiver portion 62 and neck portion 64. As indicated in FIG. 7B, the flexible funnel 60 is designed to be folded essentially flat for inclusion with a device 10 in a sterile specimen kit packaged in a transparent plastic bag (not shown). When formed in this manner, the cap 50 is affixed to the funnel 60 by a thin, easily severable, threadlike segment 56.

In preparation for use, the patient will remove the funnel 60 from the flat pack and squeeze the folded edges 66 to restore the funnel 60 to a generally circular configuration. The neck 64 is then placed within the open end 22 of the device 10 and a sample, such as urine, is deposited within the receiver portion 62 and directed into the tubular container of the device 10.

When the specimen has been deposited within the device 10, the funnel 60 may be removed and the cap 50 detached from the funnel 60 and inserted into the end opening 22. Thereafter, the device 10 with the contained sample is ready for centrifuging to automatically prepare the specimen within the microscope slide portion of the device 10.

The transition portion 16 of the device 10 may be varied in shape to suit the purpose. FIG. 10A shows an enlarged side sectional view of the terminal end portion of the device 10. In FIG. 10A, the flat rear face 18 extends all the way to the end 36 in the same plane, thus avoiding the offset of the transition portion 16 as it appears in FIG. 3. Reference numeral 40 indicates the opening of the chamber 34 at the point at which the high power curve surface of the clearance section 26 joins the upper face 30 of the microscope slide portion 14.

FIG. 10B shows another configuration of the offset at the transition portion 16'. In the view of FIG. 10B, the transition portion 16' has a generally S-shaped curved cross-section rather than the zig-zag, somewhat Z-shaped, configuration of FIG. 3. In injection molding the device 10 of FIG. 10B, the gently radiused curves of the transition portion 16' allow the plastic to flow more smoothly into the slide portion 14, thus applying less transverse force against the blade which constitutes the terminal end of the male part of the die used in the injection molding and thus reducing the likelihood that the blade will be displaced from is proper location within the mold.

Devices in accordance with the present invention advantageously provide a transport system for the automatic preparation of a microscope slide in a centrifuge. The centrifuge tube and microscope slide are integrally formed as a unitary device. This provides major advantages in product fabrication and in the ultimate use of the product. Because the product is molded as a single part, fabrication is simplified, and costs of materials and labor are reduced. In use, the device admits of the automatic preparation of a microscope slide from the specimen in a centrifuge tube, and the resulting slide is provided with a convenient extension which serves as a handle during transport and manipulation on the microscope stage. The device is shaped so that a microscope lens turret may be rotated between lens positions while the device is in place for specimen viewing on the microscope stand without interference between slide and lenses. An optional funnel and closure cap may be included in a kit to facilitate specimen collection and processing when the device is used.

Although there have been described above specific arrangements of an improved unitary specimen collection tube and microscope slide device in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. An integral specimen collection tube and microscope slide device which comprises in combination:
   an elongated tubular container portion having means defining an entrance opening at a proximal end and an exit opening at a distal end, said container portion having a flat planar surface extending along a rear side thereof;
   a slide portion joined to the container portion at said distal end and extending longitudinally beyond the container portion to a closed terminal end of the device; the slide portion comprising flat, optically transparent, opposed parallel base and cover members defining a chamber for receiving a specimen and displaying same for viewing through a microscope having a slide supporting stage;
   means defining a transition portion between the tubular container and slide portions for locating the slide portion base member in alignment with said planar surface adjacent the microscope stage when the device is placed on the stage with the flat rear side in contact with the stage; and
   means defining a lens clearance section of the tubular container portion in the form of a generally transversely flat, longitudinally curved, concave surface extending from the cover member to a juncture with the wall of the tubular container portion remote from the cover member opposite the longitudinal center line of said planar surface.

2. The device of claim 1 wherein said concave surface extends generally tangentially from the proximal end of the cover member.

3. The device of claim 2 wherein said concave surface merges with said cover member in the vicinity of said transition portion.

4. The device of claim 1 wherein said juncture is located in the vicinity of the longitudinal midpoint of the tubular container portion.

5. The device of claim 1 wherein said slide portion base member constitutes a co-planar extension of the flat planar surface along the rear side of the container portion.

6. The device of claim 1 wherein said slide portion base member is parallel to but displaced slightly from the plane of said flat planar surface.

7. The device of claim 6 wherein said transition portion comprises a generally Z-shaped segment defining a wall joining the base member to the flat planar surface.

8. The device of claim 6 wherein said transition portion comprises a generally S-shaped wall having radiused terminal segments joining said base member and said flat planar surface.

9. The device of claim 1 wherein said chamber is bounded by closed side edges of said slide portion and by said closed terminal end and has an opening along a proximal end of the slide portion communicating with the exit opening of the tubular container portion.

10. The device of claim 9 wherein said chamber is approximately 0.009 to 0.0012 inch thick.

11. The device of claim 9 wherein said chamber further includes channel means extending from the chamber entrance opening along a major extent of the chamber to facilitate the movement of specimen particulates into said chamber and effect a more even distribution therein.

12. The device of claim 11 wherein said channel means comprise a pair of elongated channels extending longitudinally of the chamber along opposite edges thereof.

13. The device of claim 12 wherein said channels continue to a junction with each other across the terminal end of the chamber.

14. The device of claim 11 wherein said channel means comprise a generally V-shaped channel extending longitudinally of the chamber.

15. The device of claim 11 wherein the opening of the chamber and channel means is configured in a generally U-shaped transverse cross-section.

16. The device of claim 11 wherein the opening of the chamber and channel means is configured in a generally I-shaped transverse cross-section.

17. The device of claim 11 wherein the opening of the chamber and channel means is configured in a generally H-shaped transverse cross-section.

18. The device of claim 1 wherein the slide portion comprises a sandwich configuration including said chamber and said base and cover members wherein the base member is approximately 0.040 inch thick, the chamber is approximately 0.008 to 0.010 inch thick, and the cover member is approximately 0.009 to 0.012 inch thick, said sandwich configuration being approximately 0.060 inch thick.

19. A kit for the automatic preparation of a microscope slide in a centrifuge including the device of claim 1 in combination with a molded plastic cap for sealing said entrance opening, the configuration of the cap being shaped to mate with said entrance opening including the provision of a flat along one side to match the flat planar surface of the container portion.

20. The kit of claim 19 wherein said cap includes molded peripheral sealing rings extending about the periphery of the cap for sealingly engaging the inner wall of the container portion adjacent to the entrance opening.

21. The kit of claim 20 further including a funnel molded of flexible plastic, said funnel being adapted to be folded substantially flat for packing in the kit and restored to a generally circular configuration for engagement with the tubular container portion through said opening in order to facilitate the transfer of a specimen into said device.

22. The combination of claim 21 wherein said cap and said funnel are formed together as molded one-piece unit which is severable to remove the cap from the funnel.

* * * * *